(12) United States Patent
Deckman et al.

(10) Patent No.: US 7,049,259 B1
(45) Date of Patent: May 23, 2006

(54) MOLECULAR SIEVE LAYERS AND PROCESSES FOR THEIR MANUFACTURE

(75) Inventors: Harry William Deckman, Clinton, NJ (US); Allan Joseph Jacobson, Houston, TX (US); James Alexander McHenry, Washington, NJ (US); Klaas Keizer, Hoogeveen (NL); Zeger Alexander Eduard Pieter Vroon, Eindhoven (NL); Lothar Ruediger Czarnetzki, Karlsruhe (DE); Frank Wenyih Lai, Bridgewater, NJ (US); Antonie Jan Bons, Kessel-Lo (BE); Anthonie Jan Burggraaf, Enschede (NL); Johannes Petrus Verduijn, deceased, late of Leefdaal (BE); by Jannetje Maatje van den Berge, legal representative, Oostvoorne (NL); Edward William Corcoran, Jr., Easton, PA (US); Wilfred Jozef Mortier, Kessel-Lo (BE)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 08/545,707

(22) PCT Filed: Apr. 25, 1994

(86) PCT No.: PCT/EP94/01301

§ 371 (c)(1),
(2), (4) Date: Sep. 28, 1998

(87) PCT Pub. No.: WO94/25151

PCT Pub. Date: Nov. 10, 1994

(30) Foreign Application Priority Data

Apr. 23, 1993 (EP) .................... 93303187

(51) Int. Cl.
*B01J 29/06* (2006.01)
(52) U.S. Cl. ............... 502/4; 502/60; 502/64
(58) Field of Classification Search .......... 502/4, 502/60, 64
See application file for complete search history.

(56) References Cited

U.S. PATENT DOCUMENTS

| 3,266,973 | A | | 8/1966 | Crowley ............... 162/164 |
| 3,791,969 | A | | 2/1974 | Patil et al. ............. 210/23 |
| 4,012,206 | A | | 3/1977 | Macriss et al. ........... 55/34 |
| 4,735,193 | A | | 4/1988 | Kulprathipanja et al. .. 127/46.3 |
| 4,740,219 | A | | 4/1988 | Kulprathipanja et al. ..... 55/16 |
| 4,925,562 | A | * | 5/1990 | te Hennepe et al. .... 210/500.25 |
| 5,019,263 | A | | 5/1991 | Haag et al. .......... 210/500.25 |
| 5,151,110 | A | * | 9/1992 | Bein et al. ............. 95/140 |
| 5,266,542 | A | * | 11/1993 | Hashimoto et al. ........ 502/64 |
| 5,429,743 | A | | 7/1995 | Geus et al. ............ 210/490 |
| 5,567,664 | A | | 10/1996 | Barri et al. ............. 502/4 |
| 5,591,345 | A | * | 1/1997 | Engelen et al. .......... 210/640 |
| 5,605,631 | A | | 2/1997 | Barri et al. ............. 210/650 |
| 5,723,397 | A | * | 3/1998 | Verduijn ................ 502/4 |
| 5,763,347 | A | * | 6/1998 | Lai ..................... 502/4 |
| 5,824,617 | A | * | 10/1998 | Lai ..................... 502/4 |
| 5,863,516 | A | * | 1/1999 | Otterstedt et al. ........ 423/700 |
| 5,895,769 | A | * | 4/1999 | Lai ..................... 502/4 |
| 6,177,373 | B1 | * | 1/2001 | Sterte et al. ............. 502/4 |
| 6,635,594 | B1 | * | 10/2003 | Bratton et al. ............ 502/4 |

FOREIGN PATENT DOCUMENTS

| EP | 0135069 | | 3/1985 |
| EP | 0149343 | | 7/1985 |
| EP | 0397216 | | 11/1990 |
| EP | 0 458 790 | * | 12/1991 |
| EP | 0 466 396 | * | 1/1992 |
| EP | 0481660 | | 4/1992 |
| EP | 0511739 | | 11/1992 |
| WO | WO 93/19841 | * | 10/1993 |

OTHER PUBLICATIONS

Journal of Membrane Science, vol. 73, 1992 pp. 119-128 Meng-Dong, et al.

* cited by examiner

*Primary Examiner*—Christina Johnson
(74) *Attorney, Agent, or Firm*—Gerard J. Hughes; Bruce M. Bordelon

(57) ABSTRACT

Layers comprising a molecular sieve layer on a porous or non-porous support, having uniform properties and allowing high flux are prepared from colloidal solutions of zeolite or other molecular sieve precursors (particle size less than 100 nm), by deposition, e.g., by spin or dip-coating, or by in situ crystallization.

7 Claims, 9 Drawing Sheets

SILICA/ZEOLITE LAYER 1μm

α ALUMINA SUBSTRATE

SILICA/ZEOLITE LAYER 40 μm

α ALUMINA SUBSTRA

FIG. 6
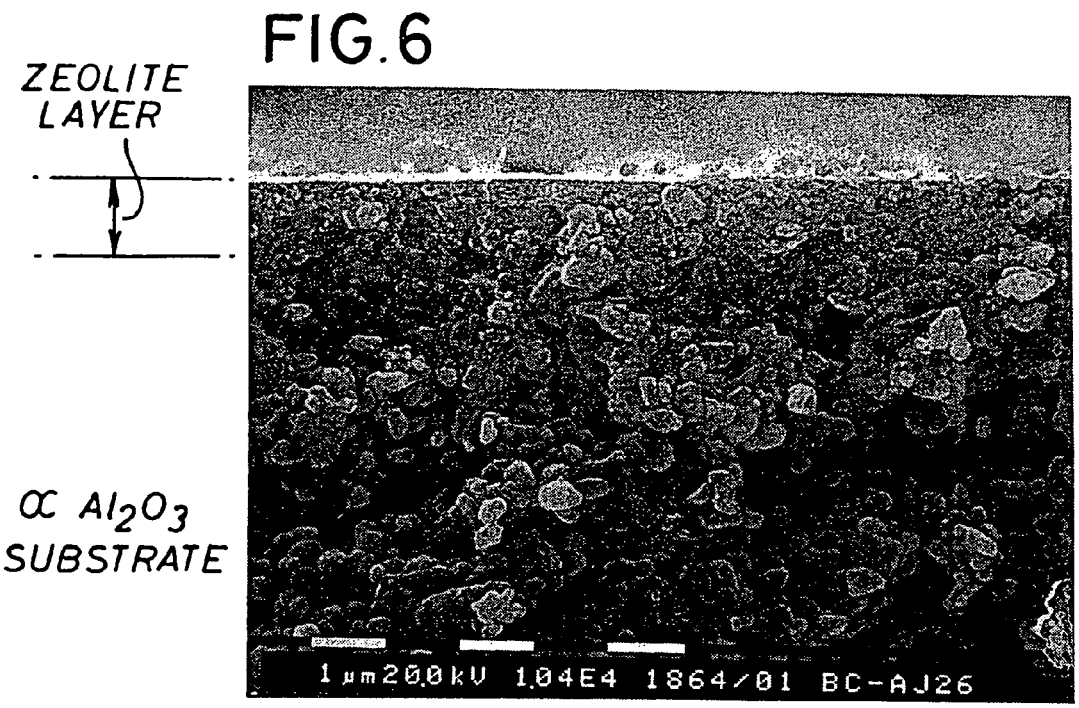
ZEOLITE LAYER
α Al₂O₃ SUBSTRATE
FIG. 7    x 40,000
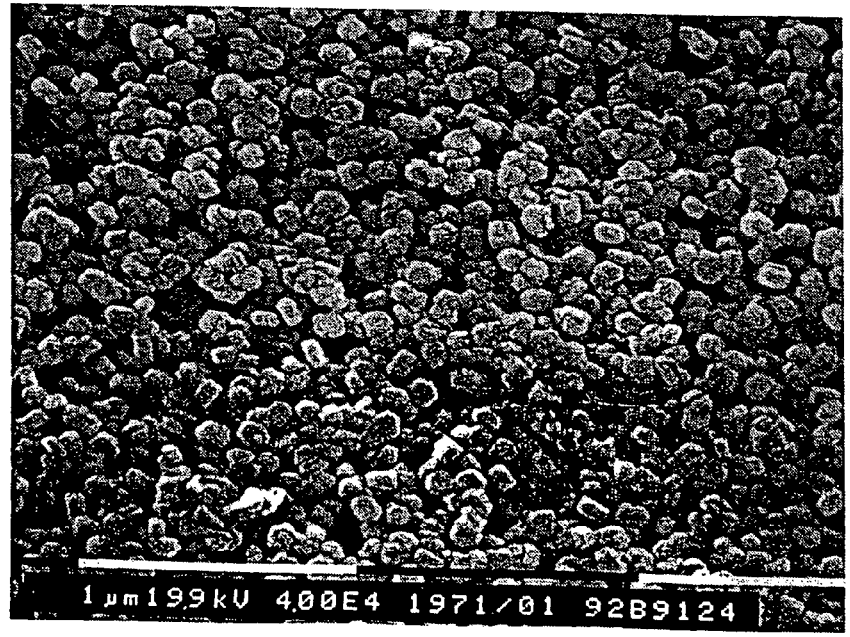

FIG. 9    x 5,000
FIG. 10    x 5,000
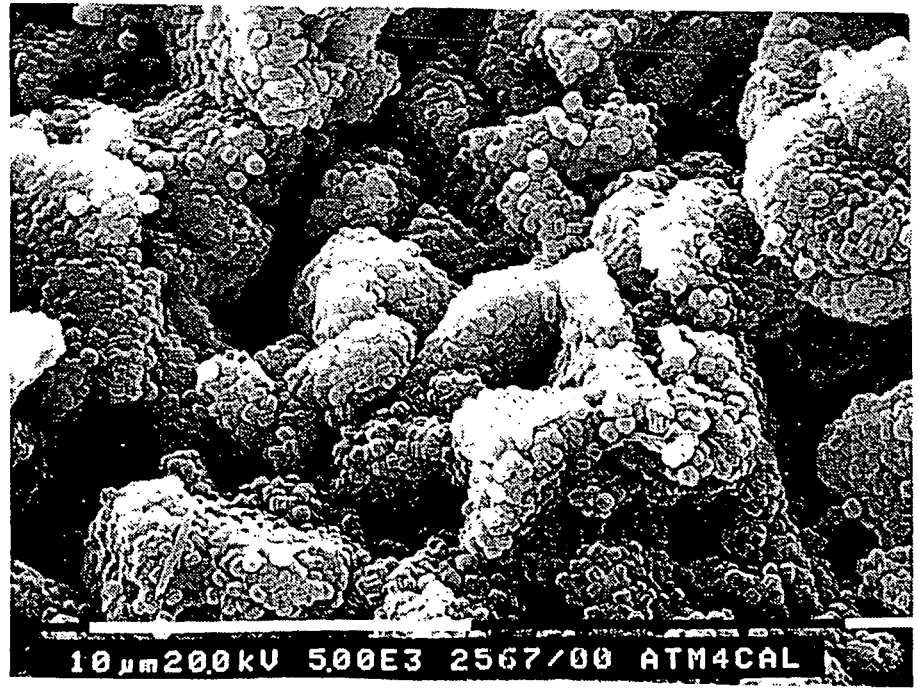

FIG.11  x 10,000
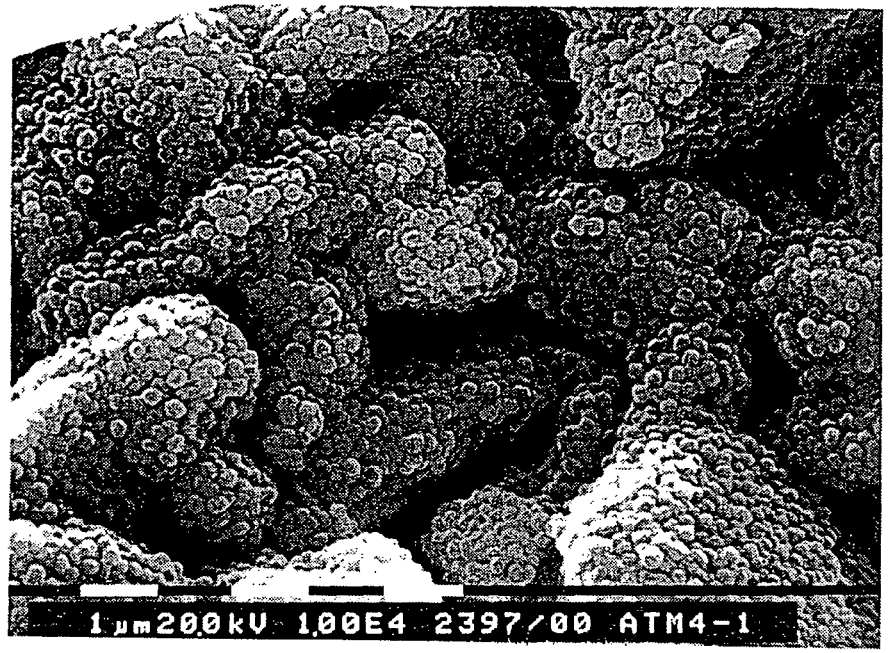
FIG.12  x 156
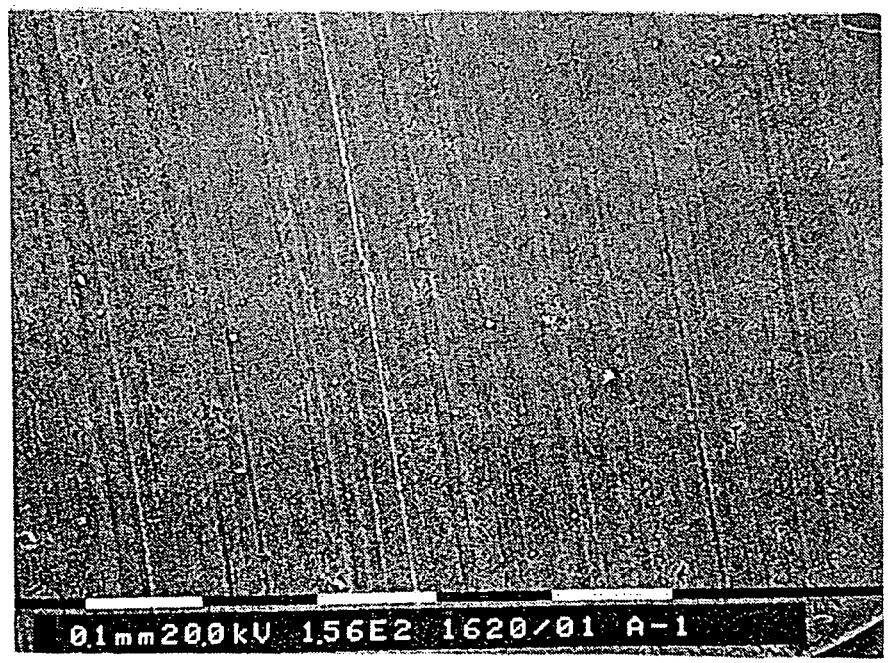

FIG.13  x 10,000
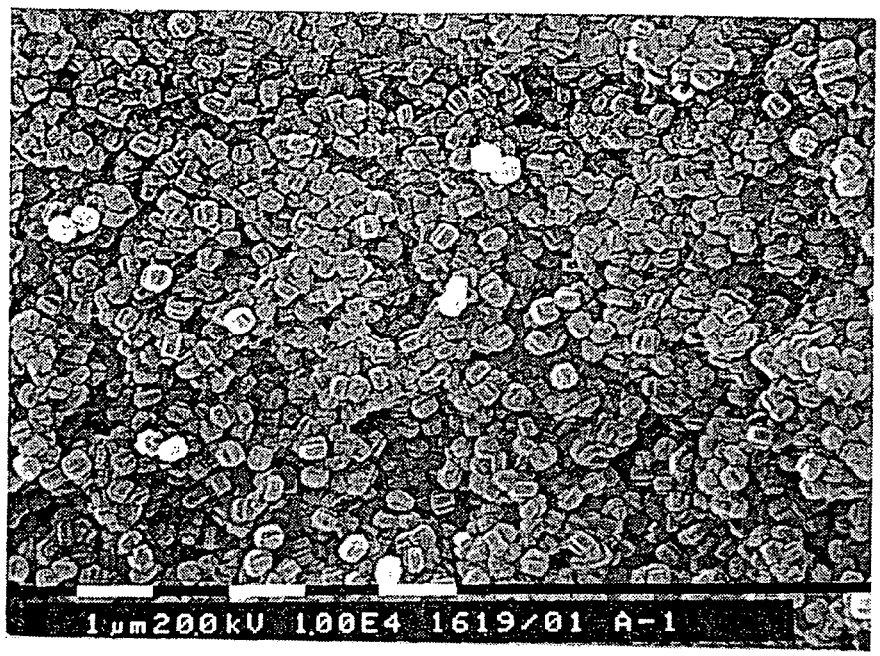
FIG.14  x 80,000
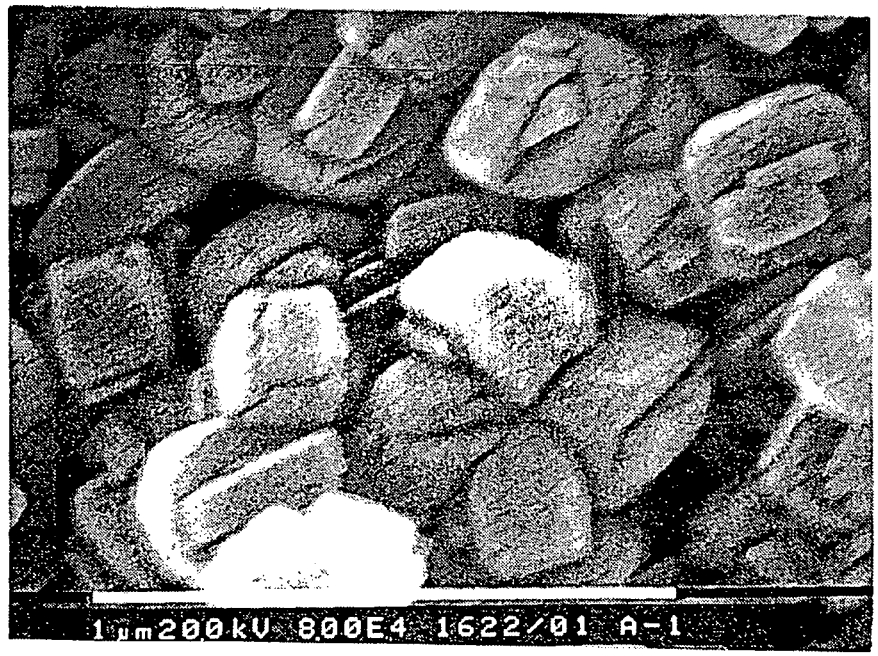

MOLECULAR SIEVE LAYERS AND PROCESSES FOR THEIR MANUFACTURE

This invention relates to molecular sieves, more especially to crystalline molecular sieves, and to layers containing them. More especially, the invention relates to a layer, especially a supported layer, containing particles of a crystalline molecular sieve.

Molecular sieves find many uses in physical, physicochemical, and chemical processes, most notably as selective sorbents, effecting separation of components in mixtures, and as catalysts. In these applications, the crystallographically-defined pore structure within the molecular sieve material is normally required to be open, and it is then a prerequisite that any structure-directing agent, or template, that has been employed in the manufacture of the molecular sieve be removed, usually by calcination.

Numerous materials are known to act as molecular sieves, among which zeolites form a well-known class. Examples of zeolites and other materials suitable for use in the invention will be given below.

When molecular sieves are used as sorbents or catalysts they are often in granular form. Such granules may be composed entirely of the molecular sieve or be a composite of a binder or support and the molecular sieve, with the latter distributed throughout the entire volume of the granule. In any event, the granule usually contains a non-molecular sieve pore structure which improves mass transfer through the granule.

The support may be continuous, e.g., in the form of a plate, or it may be discontinuous, e.g., in the form of granules. The molecular sieve crystals may be of such a size that, although the pores of the support are occupied by the crystals, the pores remain open. Alternatively, the molecular sieve may occupy the pores to an extent that the pores are effectively closed; in this case, when the support is continuous a molecular sieve membrane may result.

Thus, depending on the arrangement chosen and the nature and size of the material to be contacted by the molecular sieve, material may pass through the bulk of the molecular sieve material entirely through the pores of the molecular sieve material, or entirely through interstices between individual particles of the molecular sieve material, or partly through the pores and partly through the interstices.

Molecular sieve layers having the permeation path entirely through the the molecular sieve crystals have been proposed for a variety of size and shape selective separations. Membranes containing molecular sieve crystals have also been proposed as catalysts having the advantage that they may perform catalysis and separation simultaneously if desired.

In EP-A-135069, there is disclosed a composite membrane comprising a porous support, which may be a metal, e.g., sintered stainless steel, an inorganic material, or a polymer, one surface of which is combined with an ultra thin (less than 25 nm) film of a zeolite. In the corresponding U.S. Pat. No. 4,699,892, it is specifically stated that the zeolite is non-granular. In EP-A-180200, a composite membrane is disclosed, employing a zeolite that has been subjected to microfiltration to remove all particles of 7.5 nm and above. The membrane is made by impregnation of a porous support by the ultrafiltered zeolite solution, resulting in a distribution of the zeolite crystals within the pore structure.

In EP-A-481660, which contains an extensive discussion of earlier references to membranes, there is disclosed a zeolite membrane on a porous support, in which the zeolite crystals are stated to form an essentially continuous layer over and be directly bonded to the support. The membrane is formed by immersing the support in a synthesis gel, multiple immersions being employed to ensure that any pinholes are occluded by the zeolite crystals being formed within the pores.

Zeolites with a small particle size and narrow size distribution are disclosed for use in composite poly-dimethylsiloxane membranes in J. Mem. Sci. 73 (1992) p 119 to 128, by Meng-Dong Jia et al; however, the crystal size, though uniform, is within the range of 200 to 500 nm. Bein et al, in Zeolites, Facts, Figures, Future, Elsevier, 1989, pp 887 to 896, disclose the manufacture of zeolite Y crystals of a size of about 250 nm and embedding them in a glassy silica matrix. Even smaller sizes such as 2 to 10 nm are envisaged in WO 92/19574.

In Zeolites, 1992, Vol. 12, p 126, Tsikoyiannis and Haag describe the formation of membranes from zeolite synthesis gels on both porous and non-porous supports; when the support is non-porous, e.g., poly-tetrafluorethylene or silver, the membrane is separable from the support. When the support is porous, e.g., a Vycor (a trademark) porous glass disk, the membrane is strongly bonded to the surface, zeolite crystallization within the pores being prevented by presoaking the disk in water.

Numerous other techniques for forming membranes have been proposed.

In EP-A-397216, methods of making crack- and pinhole-free alumina films of a thickness within the range of from 0.01 to 2 μm on a porous support layer are described, the methods including brush, spray, dip, spin coating, electrophoretic and thermophoretic techniques. The membranes may be pretreated.

Despite the proposals in these literature and patent references, there still remains a need for a supported inorganic molecular sieve layer having a controllable thickness that may, if desired, be of a thickness of the order of only a few microns. There accordingly also remains a need for a process of manufacturing such a layer whereby the uniformity of the layer thickness may be controlled, even when the layer is thin.

Such a layer and a process for its manufacture make possible the production of a number of useful products, including membranes, which because of their uniformity and thinness will have predictable properties, and will permit a high flux.

It has now been found that such a supported layer is obtainable using as starting material a crystalline molecular sieve of very small particle size, preferably of a size that a true colloidal dispersion of the particles may be obtained, and preferably also of a narrow particle size distribution.

BRIEF DESCRIPTION OF THE FIGURE

FIG. 6 is an SEM image of the cross-section of a silica/zeolite layer manufactured on a porous alpha-alumina support by spin-coating in conjunction with the use of a temporary barrier layer and hydrothermal crystallization techniques.

FIG. 7 is a SEM image of the top-view of a silica/zeolite layer manufactured on alpha-alumina support by dipping the support into a silica/zeolite mixture in conjunction with the use of an aging solution and heart treatment.

FIG. 9 is an SEM image of an alpha-alumina support surface prior to in-situ formation of zeolite crystals on the support.

FIG. 10 is an SEM image of an alpha-alumina support surface following in-situ formation of zeolite crystals on the support at 150° C. followed by calcining.

FIG. 11 is an SEM image of an alpha-alumina support surface following in-situ formation of zeolite crystals on the support at 98° C. followed by calcining.

FIG. 12 is an SEM image (at 156×magnification) of a alpha-alumina support surface following in-situ formation of zeolite crystals on the support at 120° C. followed by calcining.

FIG. 13 is an SEM image (at 10,000×magnification) of the same alpha-alumina support surface as FIGS. 12 and 14.

FIG. 14 is an SEM image (at 80,000×magnification) of the same alpha-alumina support surface as FIGS. 12 and 13.

Figure 1:
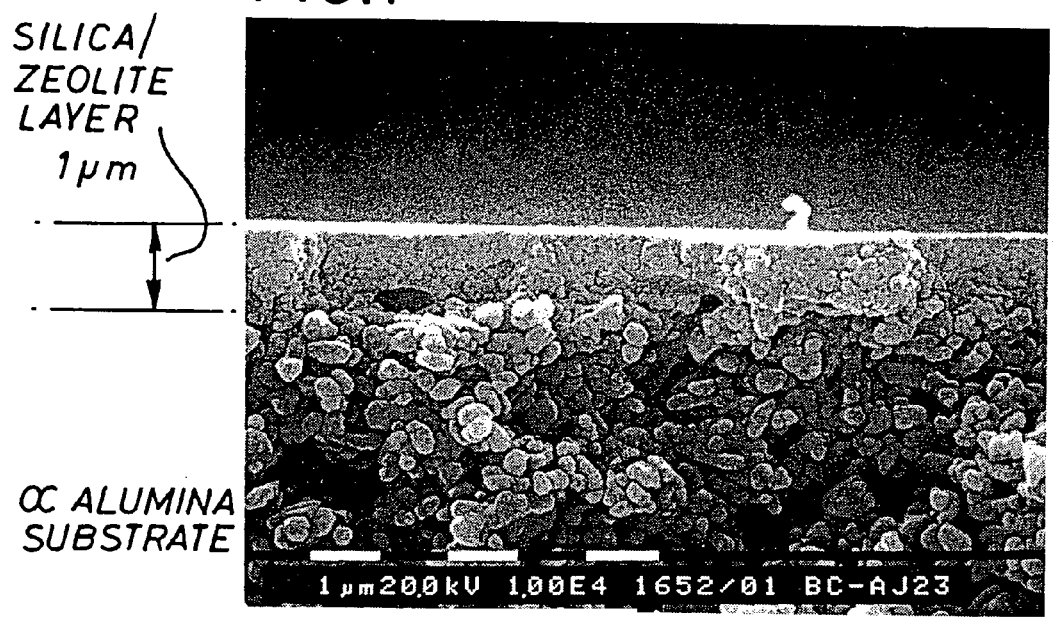
FIG. 1 is a Scanning Electron Microscopy ("SEM") image of the cross-section of a silica/zeolite layer manufactured on a porous alpha-alumina support by spin-coating in conjunction with the use of a temporary barrier layer.

In a first aspect of the invention, there is provided a layer comprising a supported inorganic layer comprising contiguous particles of a crystalline molecular sieve, the particles having a mean particle size within the range of from 20 nm to 1 μm.

Advantageously, in the first aspect of the invention, the mean particle size is within the range of from 20 to 500 nm, preferably it is within the range of from 20 to 300 nm and most preferably within the range of from 20 to 200 nm. Alternatively, the mean particle size is advantageously such that at least 5% of the unit cells of the crystal are at the crystal surface.

In a second aspect of the invention, there is provided a supported inorganic layer comprising particles of a crystalline molecular sieve, the particles having a mean particle size within the range of from 20 to 200 nm.

In both the first and second aspects of the invention, the layer comprises molecular sieve particles optionally coated with skin of a different material; these are identifiable as individual particles (although they may be intergrown as indicated below) by electron microscopy. The layer, at least after activation, is mechanically cohesive and rigid. Within the interstices between the particles in this rigid layer, there may exist a plethora of non-molecular sieve pores, which may be open, or partially open, to permit passage of material through or within the layer, or may be completely sealed, permitting passage through the layer only through the pores in the particles.

Advantageously, the particle size distribution is such that 95% of the particles have a size within ±33% of the mean, preferably 95% are within ±15% of the mean, preferably +10% of the mean and most preferably 95% are within ±7.5% of the mean.

It will be understood that the particle size of the molecular sieve material forming the layer may vary continuously or stepwise with distance from the support. In such a case, the requirement for uniformity is met if the particle size distribution is within the defined limit at one given distance from the support, although advantageously the particle size distribution will be within the defined limit at each given distance from the support.

The use of molecular sieve crystals of small particle size and preferably of homogeneous size distribution facilitates the manufacture of a three-dimensional structure which may if desired be thin but which is still of controlled thickness.

In the first aspect of the invention, the particles are contiguous, i.e., substantially every particle is in contact with one or more of its neighbours as evidenced by electron microscopy preferably high resolution microscopy, although not necessarily in contact with all its closest neighbours. Such contact may be such in some embodiments that neighbouring crystal particles are intergrown, provided they retain their identity as individual crystalline particles. Advantageously, the resulting three dimensional structure is grain-supported, rather than matrix-supported, in the embodiments where the layer does not consist essentially of the crystalline molecular sieve particles. In a preferred embodiment, the particles in the layer are closely packed.

In the second aspect of the invention, the particles may be contiguous, but need not be.

A layer in accordance with either the first or the second aspect of the invention may be constructed to contain passageways between the particles that provide a non-molecular sieve pore structure through or into the layer. Such a layer may consist essentially of the particles or may contain another component, which may be loosely termed a matrix which, while surrounding the particles, does not so completely or closely do so that all pathways round the particles are closed. Alternatively, the layer may be constructed so that a matrix present completely closes such pathways, with the result that the only path through or into the layer is through the particles themselves.

It will be understood that references herein to the support of a layer include both continuous and discontinuous supports.

References to particle size are throughout this specification to the longest dimension of the particle and particle sizes are as measured by direct imaging with electron microscopy. Particle size distribution may be determined by inspection of scanning or transmission electron micrograph images preferably on lattice images, and analysing an appropriately sized population of particles for particle size.

As molecular sieve, there may be mentioned a silicate, metallosilicates an aluminosilicate, an aluminophosphate, a silicoaluminophosphate, a metalloaluminophosphate, or a metalloaluminophosphosilicate or a gallosilicate.

The preferred molecular sieve will depend on the chosen application, for example, separation, catalytic applications, and combined reaction separation. There are many known ways to tailor the properties of the molecular sieves, for example, structure type, chemical composition, ion-exchange, and activation procedures.

Representative examples are molecular sieves/zeolites of the structure types AFI, AEL, BEA, CHA, EUO, FAU, FER, KFI, LTA, LTL, MAZ, MOR, MFI, MEL, MTW, OFF and TON.

Some of the above materials while not being true zeolites are frequently referred to in the literature as such, and this term will be used broadly in the specification below.

A supported layer according to the invention may be manufactured in a number of different ways. In one embodiment the invention provides a process of making a layer by deposition on a support from a colloidal zeolite suspension obtainable by preparing an aqueous synthesis mixture comprising a source of silica and an organic structure directing agent in a proportion sufficient to effect substantially complete dissolution of the silica source in the mixture at the boiling temperature of the mixture, and crystallization from the synthesis mixture. The synthesis mixture will contain, in addition, a source of the other component or components, if any, in the zeolite.

The particle size of the crystals formed may be controlled by the crystallization temperature, or any other process capable of giving crystals of highly uniform particle size, in a size such that a stable colloidal suspension may be obtained. A stable colloidal suspension is one in which no visible separation occurs on standing for a prolonged period, e.g., one month. Details of the procedure for preparing the colloidal suspension mentioned above are given in our co-pending Application No. PCT/EP92/02386, the entire disclosure of which is incorporated by reference herein.

The invention also provides a supported layer made by the above process.

In accordance with preferred processes according to the invention, the silica is advantageously introduced into the synthesis mixture as silicic acid powder.

The organic structure directing agent is advantageously introduced into the synthesis mixture in the form of a base, specifically in the form of a hydroxide, but a salt, e.g, a halide, especially a bromide, may be employed.

The structure directing agent may be, for example, the hydroxide or salt of tetramethylammonium (TMA), tetraethylammonium (TEA), triethylmethylammonium (TEMA), tetrapropylammonium (TPA), tetrabutylammonium (TBA), tetrabutylphosphonium (TBP), trimethylbenzylammonium (TMBA), trimethylcetylammonium (TMCA), trimethylneopentylammonium (TMNA), triphenylbenzylphosphonium (TPBP), bispyrrolidinium (BP), ethylpyridinium (EP), diethylpiperidinium (DEPP) or a substituted azoniabicyclooctane, e.g. methyl or ethyl substituted quinuclidine or 1,4-diazoniabicyclo-(2,2,2)octane.

Preferred structure directing agents are the hydroxides of TMA, TEA, TPA and TBA.

Further processes for the manufacture of layers according to the invention, including specific methods of depositing the molecular sieve on the support and post-treatment of the resulting layer, will be given below.

The thickness of the molecular sieve layer is advantageously within the range of 0.1 to 20 μm preferably 0.1 to 15 μm, more preferably from 0.1 to 2 μm. Advantageously, the thickness of the layer and the particle size of the molecular sieve are such that the layer thickness is at least twice the particle size, resulting in a layer several particles thick rather than a monolayer of particles.

Advantageously, the layer is substantially free of pinholes, i.e., substantially free from apertures of greatest dimension greater than 0.1 μm. Advantageously, at most 0.1% and preferably at most 0.0001% of the surface area is occupied by such apertures.

Depending on the intended end use of the layer, a greater or smaller proportion of the area of the layer may be occupied by macropores, apertures having a greatest dimension less than 0.1 μm but greater than 1 nm. These macropores may be formed by the interstices between the crystals of the molecular sieve, if the layer consists essentially of the molecular sieve, and elsewhere, if the layer comprises the molecular sieve and other components. Such layers may be used, inter alia, for ultrafiltration, catalytic conversion, and separations based on differences in molecular mass (Knudsen diffusion), and indeed for any processes in which a high surface area is important.

The layer advantageously has a large proportion of its area occupied by crystalline-bounded micropores, i.e., pores of a size between 0.2 and 1 nm, depending on the particular molecular sieve being employed. Pores of size within the micropore range result, for example, when the layer contains a component in addition to one derived from colloidal molecular sieve particles. In another embodiment especially suitable for ultrafiltration, the layer contains nanopores, i.e., pores of a size between 1 and 10 nm.

The layer support may be either non-porous or, preferably, porous, and may be continuous or particulate. As examples of non-porous supports there may be mentioned glass, fused quartz, and silica, silicon, dense ceramic, for example, clay, and metals. As examples of porous supports, there may be mentioned porous glass, sintered porous metals, e.g., steel or nickel (which have pore sizes typically within the range of 0.2 to 15 μm), and, especially, an inorganic oxide, e.g., alpha-alumina, titania, an alumina/zirconia mixture, or Cordierite.

At the surface in contact with the layer, the support may have pores of dimensions up to 50 times the layer thickness, but preferably the pore dimensions are comparable to the layer thickness.

Advantageously, the support is porous alpha-alumina with a surface pore size within the range of from 0.08 to 10 μm, preferably from 0.08 to 1 μm, most preferably from 0.08 to 0.16 μm, and advantageously with a narrow pore size distribution. The support may be multilayered; for example, to improve the mass transfer characteristics of the layer, only the surface region of the support in contact with the layer may have small diameter pores, while the bulk of the support, toward the surface remote from the layer, may have large diameter pores. An example of such a multilayer support is an alpha-alumina disk having pores of about 1 μm diameter coated with a layer of alpha-alumina with pore size about 0.08 μm.

The invention also provides a structure in which the support, especially a continuous porous support, has a molecular sieve layer on each side of the support, the layers on the two sides being the same or different.

The layer may, and for many uses advantageously does, consist essentially of the molecular sieve material, or it may be a composite of the molecular sieve material and intercalating material which is also inorganic. The intercalating material may be the material of the support. If the layer is a composite it may, as indicated above, contain macropores and/or micropores, bounded by molecular sieve portions, by portions of intercalating material, or by both molecular sieve and intercalating material. The material may be applied to the support simultaneously with or after deposition of the molecular sieve, and may be applied, for example, by a sol-gel process followed by thermal curing. Suitable materials include, for example, inorganic oxides, e.g., silica, alumina, and titania.

The intercalating material is advantageously present in sufficiently low a proportion of the total material of the layer that the molecular sieve crystals remain contiguous.

The invention further provides additional preferred processes for manufacturing a layer.

The present invention accordingly also provides a process for the manufacture of a layer comprising a crystalline molecular sieve on a porous support, which comprises pre-treating the porous support to form at a surface thereof a barrier layer, and applying to the support a reaction mixture comprising a colloidal suspension of molecular sieve crystals, having a mean particle size of at most 100 nm and advantageously a particle size distribution such that at least 95% of the particles have a size within ±15%, preferably ±10%, more preferably within ±7.5%, of the mean, colloidal silica and optionally an organic structure directing agent, to form a supported molecular sieve layer, and if desired or required activating the resulting layer.

Activation removes the template and can be achieved by calcination, ozone treatment, plasma treatment or chemical extraction such as acid extraction.

The invention also provides a supported layer formed by the process.

The barrier layer functions to prevent the water in the aqueous reaction mixture from preferentially entering the pores of the support to an extent such that the silica and zeolite particles form a thick gel layer on the support.

The barrier layer may be temporary or permanent. As a temporary layer, there may be mentioned an impregnating fluid that is capable of being retained in the pores during application of the reaction mixture, and readily removed after such application and any subsequent treatment.

As indicated below, spin coating is an advantageous technique for applying the reaction mixture to the support according to this and other aspects of the invention. The impregnating fluid should accordingly be one that will be retained in the pores during spinning if that technique is used; accordingly the rate of rotation, pore size, and physical properties of the fluid need to be taken into account in choosing the fluid.

The fluid should also be compatible with the reaction mixture, for example if the reaction mixture is polar, the barrier fluid should also be polar. As the reaction mixture is advantageously an aqueous reaction mixture, water is advantageously used as the barrier layer.

To improve penetration, the fluid barrier may be applied at reduced pressure or elevated temperature. If spin-coating is used, the support treated with the barrier fluid is advantageously spun for a time and at a rate that will remove excess surface fluid, but not remove fluid from the pores. Premature evaporation of fluid from the outermost pores during treatment may be prevented by providing an atmosphere saturated with the liquid vapour.

As a temporary barrier layer suitable, for example, for an alpha-alumina support there may be especially mentioned water or glycol. As a permanent barrier suitable for an alpha-alumina support there may be mentioned titania, gamma-alumina or an alpha-alumina coating of smaller pore size.

The colloidal suspension of molecular sieve crystals is advantageously prepared by the process indicated above, i.e., that described in PCT Application EP/92/02386. The colloidal silica may be prepared by methods known in the art; see for example Brinker and Scherer, Sol-Gel Science, Academic Press, 1990. A preferred method is by the acid hydrolysis of tetraethyl orthosilicate. The organic structure directing agent, if used, is advantageously one of those mentioned above.

As indicated above, the reaction mixture is advantageously applied to the support by spin-coating, the viscosity of the mixture and the spin rate controlling coating thickness. The mixture is advantageously first contacted with the stationary support, then after a short contact time the support is spun at the desired rate. After spinning, the silica is advantageously aged by retaining the supported layer in a high humidity environment, and subsequently dried, advantageously first at room temperature and then in an oven.

In a further embodiment of the invention, there is provided a process for the manufacture of a layer comprising a crystalline molecular sieve on a porous support which comprises applying to the support by dip-coating a colloidal suspension of molecular sieve crystals, having a mean particle size of at most 100 nm and advantageously a particle size distribution such that at least 95% of the particles have a size within ±15%, preferably ±10%, more preferably ±7.5%, of the mean, drying the resulting gel on the support and if desired or required activating the resulting layer.

The invention also provides a layer made by the process.

In this embodiment of the invention, the pH of the suspension is an important factor. For example, at a pH above 12, colloidal silicalite crystals tend to dissolve in the medium. Adhesion of the layer to the support improves as pH is reduced, with acceptable adhesion being obtained between pH 7 and 11, good adhesion between pH 4.0 and 7, and very good adhesion below pH 4.0, although agglomeration of particles may occur at too low a pH.

Adhesion of the layer to its support may be enhanced by the inclusion in the suspension of an organic binder or surfactant, the presence of an appropriate proportion of which may also reduce the incidence of cracks in the final layer. Among binders there may be mentioned polyvinyl alcohol (PVA), advantageously with a molecular weight of from 1000 to 100000, preferably from 2000 to 10000, and most preferably in the region of 3000, and hydroxyalkyl cellulose, especially hydroxypropyl cellulose (HPC), advantageously with a molecular weight of from 50000 to 150000, and preferably in the region of 100000.

An appropriate proportion of crystals in the suspension may readily be determined by routine experiment; if the proportion is too low a continuous layer will not be reliably formed while if it is too high the layer will tend to contain cracks after activation. For silicalite, advantageous lower and upper limits are 0.5% (preferably 0.75%) and 1.5% respectively.

The time spent by the support immersed in the suspension also affects the thickness of the layer and its quality. Advantageously the dip-time is at most 15 seconds with a solution containing 1.1% by weight silicalite crystals; an immersion of from 1 to 10 seconds gives a crack-free layer of thickness 0.7 to 3 µm.

In our co-pending Application No. PCT/EP92/02330, the entire disclosure of which is incorporated by reference herein, there is disclosed the formation of an aqueous synthesis mixture comprising a source of particulate silica in which the particles advantageously have a mean diameter of at most 1 µm, seeds of an MFI zeolite having a mean particle size of at most 100 nm in the form of a colloidal suspension, an organic structure directing agent, and a source of fluorine or of an alkali metal, the synthesis mixture having an alkalinity, expressed as a molar ratio of $OH^-:SiO_2$ of at most 0.1. Crystallization of this synthesis mixture produces very uniform, small, zeolite crystals. The proportion of seed, based on the weight of the mixture, is given as from 0.05 to 1700 wppm. The synthesis mixture will additionally contain a source of any other zeolite component.

In a further embodiment of the present invention, a seeding technique may be used. In this embodiment, the invention provides a process for the manufacture of a layer comprising a crystalline molecular sieve on a porous support, which comprises applying to or forming on the support a layer comprising amorphous silica containing seeds of a zeolite having a mean particle size of at most 100 nm, and advantageously having a particle size distribution such that at least 95% of the particle have a size within ±15%, preferably ±10%, more preferably within ±7.5%, of the mean, subjecting the layer to hydrothermal crystallization, and if desired or required activating the crystallized layer.

Again, other components useful in forming the zeolite layer may be present. Such components may include, for example, an organic structure directing agent, which may be in salt form.

The invention also provides a supported layer made by the process.

The layer is advantageously applied to or formed on the support by dipcoating or spincoating, advantageously substantially as described above.

If dipcoating is used, the support is advantageously dipped into a solution containing the amorphous silica in colloidal form, advantageously with a particle size at most 0.1 μm; the solution may if desired contain other components useful in forming the final zeolite layer. If spincoating is used, the silica may be of larger particle size but is advantageously colloidal.

The layer thickness at this stage, after dipcoating or spincoating, is advantageously within the range of from 0.1 to 20 μm.

Hydrothermal crystallization to form the zeolite layer is advantageously carried out by immersing the layer in a solution described below, and heating for a time and at the temperature necessary to effect crystallization.

The solution advantageously contains either all the components necessary to form a zeolite or only those components necessary but which are not already present in the layer on the support. In the latter case, crystals do not form in the solution, which remains clear and may be re-used.

After crystallization, the supported layer may be washed, dried, and calcined in the normal way.

By this embodiment of the invention, a dense, homogeneous, and crack-free supported layer may be obtained. A 1 μm thick zeolite layer may readily be obtained, with a grain size of 100 to 300 nm.

In a further embodiment of the invention, molecular sieve crystals are synthesized in situ on the support. According to this embodiment, the invention provides a process for the manufacture of a layer comprising a crystalline molecular sieve on a porous support, which comprises preparing a synthesis mixture comprising a source of silica and an organic structure directing agent preferably in the form of a hydroxide in a proportion sufficient to effect substantially complete dissolution of the silica source in the mixture at the boiling temperature of the mixture, immersing the support in the synthesis mixture, crystallizing zeolite from the synthesis mixture onto the support, and if desired or required activating the crystallized layer.

The invention also provides a supported layer made by the process.

The synthesis mixture will also contain a source of other components, if any, in the zeolite.

Advantageously, to obtain colloidal material, crystallization is effected at a temperature less than 120° C. As indicated in PCT/EP92/02386, the lower the crystallization temperature the smaller the resulting particle size of the crystals. For zeolites made in the presence of an alumina source, the particle size may also be varied by varying the alumina content. The effect of varying the alumina content is, however, not the same for all zeolites; for example, for zeolite beta, the particle size varies inversely with alumina content while for an MFI-structured zeolite the relationship is direct.

The substrate used in accordance with this aspect of the invention may be any one of those described above in connexion with other processes; an alpha-alumina support is advantageously used; the pore size may vary with the intended use of the layer; a pore size within the range 100 nm to 1.5 μm may conveniently be used. Care should be taken to avoid undue weakening of the support by for example, controlling prolonged exposure to high temperature and alkalinity.

Although the various processes of the invention described above yield a supported layer of good quality, the resulting layer may still contain apertures of greater size than desired for the intended use of the product. For example, apertures greater than those through the molecular sieve itself are undesirable if the supported layer is to be used for certain types of separation process since they result in a flux greater than desired and impaired separation. If this is the case, the supported layer may be subjected to a reparation procedure. In this procedure, the supported layer may be subjected to one of the various reparation techniques known to those skilled in the art.

It is therefore in accordance with the invention to manufacture a supported layer by first carrying out one of the layer-forming processes according to the invention and described above and following it by reparation of the layer by a method known per se.

Preferably, however, the reparation is carried out by again subjecting the supported layer to a manufacturing process of the invention.

The invention accordingly also provides a process for the manufacture of a supported layer in which one of the layer-forming processes above is carried out two or more times, or in which one of the processes above carried out one or more times is followed by another of the processes above, carried out one or more times, or in which one of the processes above is carried out two or more times with another or others of the processes above, carried out one or more times, intervening. The invention also provides a supported layer, especially a membrane, made by such a process.

The layers according to the invention and produced in accordance with the processes of the invention may be treated in manners known per se to adjust their properties, e.g., by steaming or ion exchange to introduce different cations or anions, by chemical modification, e.g., deposition of organic compounds on the crystals or into the pores of the molecular sieve, or by introduction of a metal.

The layers may be used in the form of a membrane, used herein to describe a barrier having separation properties, for separation of fluid (gaseous, liquid, or mixed) mixtures, for example, separation of a feed for a reaction from a feedstock mixture, or in catalytic applications, which may if desired combine catalysed conversion of a reactant or reactants and separation of reaction products.

Separations which may be carried out using a membrane comprising a layer in accordance with the invention include, for example, separation of normal alkanes from co-boiling hydrocarbons, for example normal alkanes from isoalkanes such as $C_4$ to $C_6$ mixtures and n-$C_{10}$ to $C_{16}$ alkanes from kerosene; separation of aromatic compounds from one another, especially separation of $C_8$ aromatic isomers from each other, more especially para-xylene from a mixture of xylenes and, optionally, ethylbenzene, and separation of aromatics of different carbon numbers, for example, mixtures of benzene, toluene, and mixed $C_8$ aromatics; separation of aromatic compounds from aliphatic compounds, especially aromatic molecules with from 6 to 8 carbon atoms from $C_5$ to $C_{10}$ (naphtha range) aliphatics; separation of olefinic compounds from saturated compounds, especially light alkenes from alkane/alkene mixtures, more especially ethene from ethane and propene from propane; removing hydrogen from hydrogen-containing streams, especially from light refinery and petrochemical gas streams, more especially from $C_2$ and lighter components; and alcohols from aqueous streams.

Separation of heteroatomic compounds from hydrocarbons such as alcohols and sulphur containing materials such as $H_2S$ and mercaptans.

The supported layer of the invention may be employed as a membrane in such separations without the problem of being damaged by contact with the materials to be separated. Furthermore, many of these separations are carried out at elevated temperatures, as high as 500° C., and it is an advantage of the supported layer of the present invention that it may be used at such elevated temperatures.

The present invention accordingly also provides a process for the separation of a fluid mixture which comprises contacting the mixture with one face of a layer according to the invention in the form of a membrane under conditions such that at least one component of the mixture has a different steady state permeability through the layer from that of another component and recovering a component or mixture of components from the other face of the layer.

Some specific reaction systems where these membranes would be advantageous for selective separation either in the reactor or on reactor effluent include: selective removal of a Para-Xylene rich mixture from the reactor, reactor product, reactor feed or other locations in a Xylenes isomerization process; selective separation of aromatics fractions or specific aromatics molecule rich streams from catalytic reforming or other aromatics generation processes such as light alkane and alkene dehydrocyclization processes (e.g. $C_3$–$C_7$ paraffins to aromatics from processes such as Cyclar), methanol to gasoline and catalytic cracking processes; selective separation of benzene rich fractions from refinery and chemical plant streams and processes; selective separation of olefins or specific olefin fractions from refinery and chemicals processing units including catalytic and thermal cracking, olefins isomerization processes, methanol to olefins processes, naphtha to olefins conversion processes, alkane dehydrogenation processes such as propane dehydrogenation to propylene; selective removal of hydrogen from refinery and chemicals streams and processes such as catlytic reforming, alkane dehydrogenation, catalytic cracking, thermal cracking, light alkane/alkene dehydrocyclization, ethylbenzene dehydrogenation, paraffin dehydrogenation; selective separation of molecular isomers in processes such as butane isomerization, butylene isomerization, paraffin isomerization, olefin isomerization; selective separation of alcohols from aqueous streams and/or other hydrocarbons; selective separation of products of bimolecular reactions where equilibrium limits conversion to the desired products, e.g. MTBE production from methanol and isobutylene, ethylbenzene from ethylene and benzene, and cumene from propylene and benzene; selective removal of 2,6 dimethyl naphthalene from mixtures of alkane substituted naphthalenes during alkylation and/or isomerization.

The invention further provides a process for catalysing a chemical reaction which comprises contacting a feedstock with a layer according to the invention which is in active catalytic form under catalytic conversion conditions and recovering a composition comprising at least one conversion product.

The invention further provides a process for catalysing a chemical reaction which comprises contacting a feedstock with one face of a layer according to the invention, that is in the form of a membrane and in active catalytic form, under catalytic conversion conditions, and recovering from an opposite face of the layer at least one conversion product, advantageously in a concentration differing from its equilibrium concentration in the reaction mixture.

The following examples illustrate the invention:

EXAMPLE 1

This example illustrates manufacture of a layer by spin-coating with a temporary barrier layer.

A porous alpha-alumina disk, diameter 25 mm, thickness 3 mm, pore size 80 nm, is soaked in demineralized water for 3 days. The soaked disk is placed in the specimen chuck of a CONVAC Model MTS-4 Spinner, and hot water is placed in the process cup to increase the humidity of the atmosphere. The disk is spun at 4000 rpm for 30 seconds. The disk is then immediately covered with a slurry comprising 25% by weight of Ludox (a trademark) AS-40 colloidal silica and 75% by weight of an aqueous dispersion containing 6.5% by weight colloidal silicalite (MFI) zeolite, mean particle size 50 nm. 10 seconds after contact between the slurry and the disk, the disk is spun at 4000 rpm for 30 seconds. The disk and the resulting silica-zeolite layer are kept in a closed vessel at relative humidity close to 100% for 3 hours to age the silica, air dried at room temperature for 2 hours and subsequently in an oven at 110° C. for 2 hours.

Under an optical microscope, the resulting silica-zeolite layer appeared smooth, crack-free, and homogeneous. Scanning Electron Microscopy (SEM) of a cross-section through the supported layer shows a layer about 1 μm thick containing uniformly sized zeolite particles—see FIG. 1. The homogeneity and continuity of the layer, coupled with its thinness, confirm that the resulting structure after calcining will form a layer according to the invention.

Figure 2:
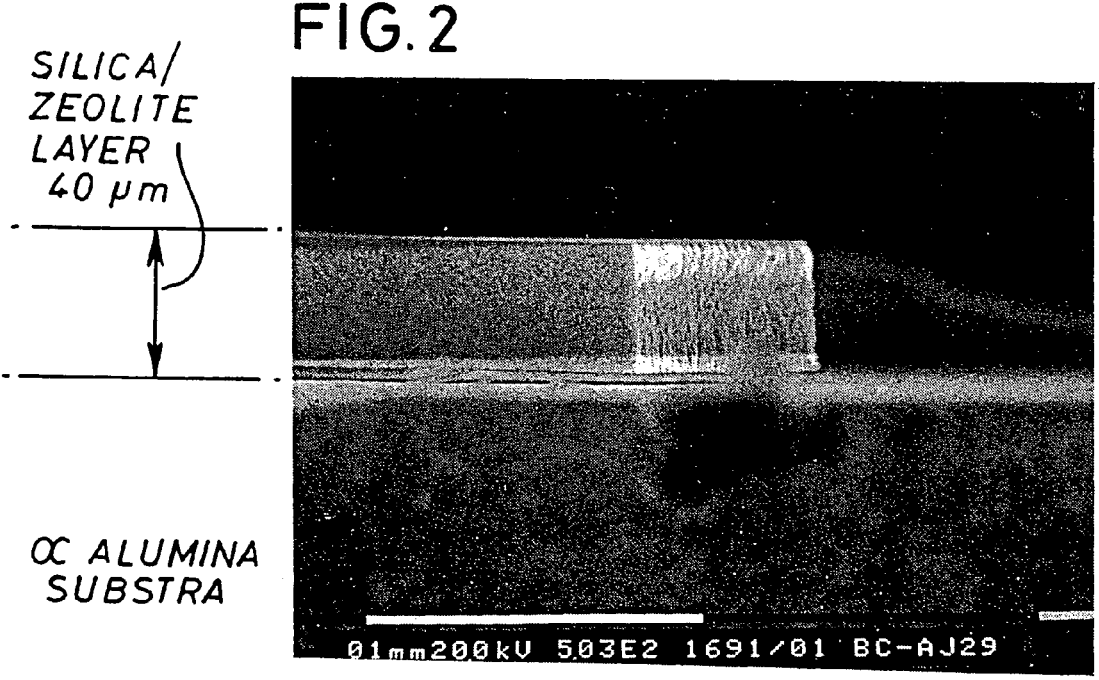
FIG. 2 is a SEM image of the cross-section of a silica/zeolite layer manufactured on a porous alpha-alumina support by spin-coating in conjunction without the use of a temporary barrier layer.

In a comparison experiment, instead of soaking the disk, it was dried at 150° C. in air for 12 hours, other process steps remaining the same. As can be seen from the SEM cross section shown in FIG. 2, the resulting layer is about 40 μm thick. It is also cracked, and not firmly attached to the substrate, making it unsuitable for use as a layer.

EXAMPLE 2

This example illustrates manufacture of a layer by spin-coating using a permanent barrier layer.

The support comprised an alpha-alumina base with a barrier layer of gamma-alumina, and was prepared as follows: A slurry was prepared by ball milling 800 g $Al_2O_3$ in 500 ml distilled water containing 4.3 ml hydrochloric acid for 16 hours to give alumina particles of mean diameter 0.5 μm. The slurry was degassed, poured into moulds and allowed to dry at ambient tempeature for 3 days. The cast pieces were heated at 5° C./min to 1200° C., then fired at 1200° C. for 2 hours. The fired pieces were then polished front and back to a thickness of about 3 mm. A gamma-alumina coating was applied by dipping the alpha-alumina piece once into a colloidal suspension of Boehmite, prepared by hydrolysis of alumina sec-butoxide in 600 ml water and 0.76 ml nitric acid. The Boehmite layer was converted to gamma-alumina by heating to 400° C. at a rate of 100° C./hour and holding for 24 hours. The coated product provides a support.

A silica sol was prepared from tetraethylorthosilicate, water, and hydrochloric acid and aged at 50° C. for 90 minutes.

A suspension of silicalite 1, mean particle size 55 nm, particle size range 40 to 70 nm, containing 8.7% by weight colloidal crystals in aqueous TPAOH, pH 10.3, was prepared and a coating slurry formed by mixing equal weights of the suspension and the sol. The resulting slurry was spin-coated onto the support at 4000 rpm.

Figure 3:
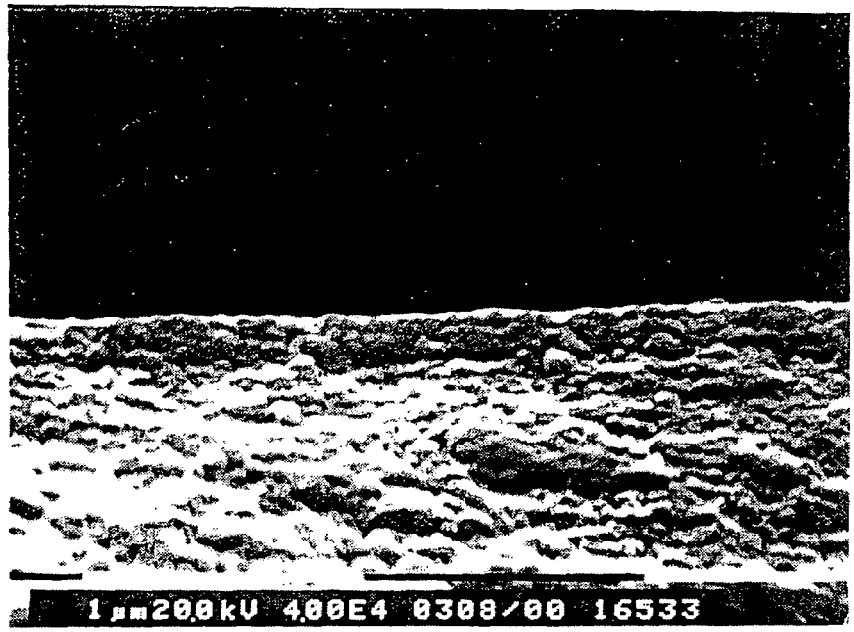
FIG. 3 is a SEM image of the cross-section of a silica/zeolite layer manufactured on a alpha-alumina support by spin-coating in conjunction with the use of a permanent barrier layer.
Figure 4:
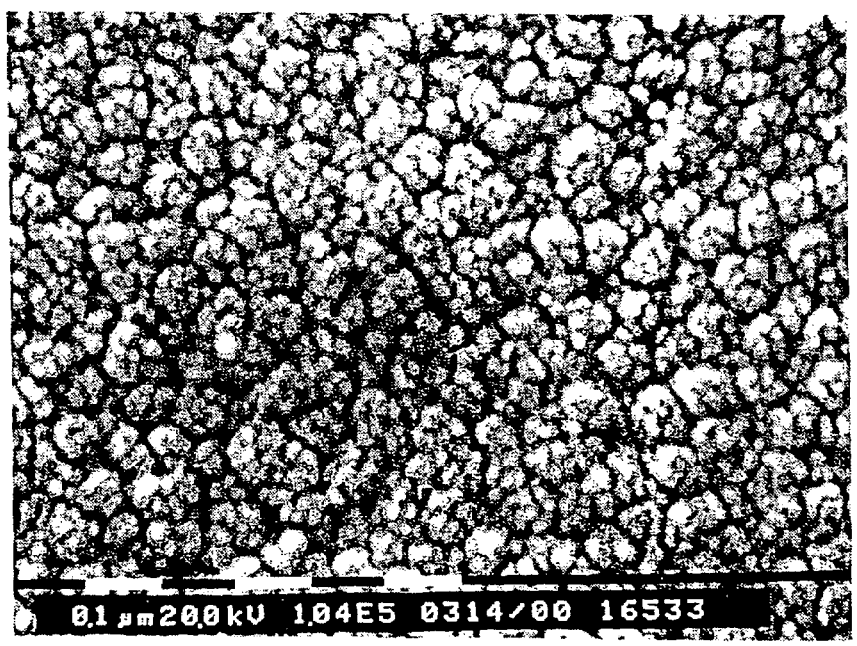
FIG. 4 is a SEM image of the top-view of a silica/zeolite layer manufactured on a alpha-alumina support by spin-coating in conjunction with the use of a permanent barrier layer.

The resulting structure was then heated to 600° C. at a heating rate of 20° C./hour. The final layer structure is shown edge on and from the top surface in FIGS. 3 and 4. The edge on view demonstrates that the layer thickness is about 0.2 µm and the top view shows the organization of the crystals in the layer, and that the crystals are incorporated into the layer with little or no change in crystal size and shape.

EXAMPLE 3

This example illustrates the use of a layer according to the invention in the separation of a hydrocarbon mixture.

Figure 5:
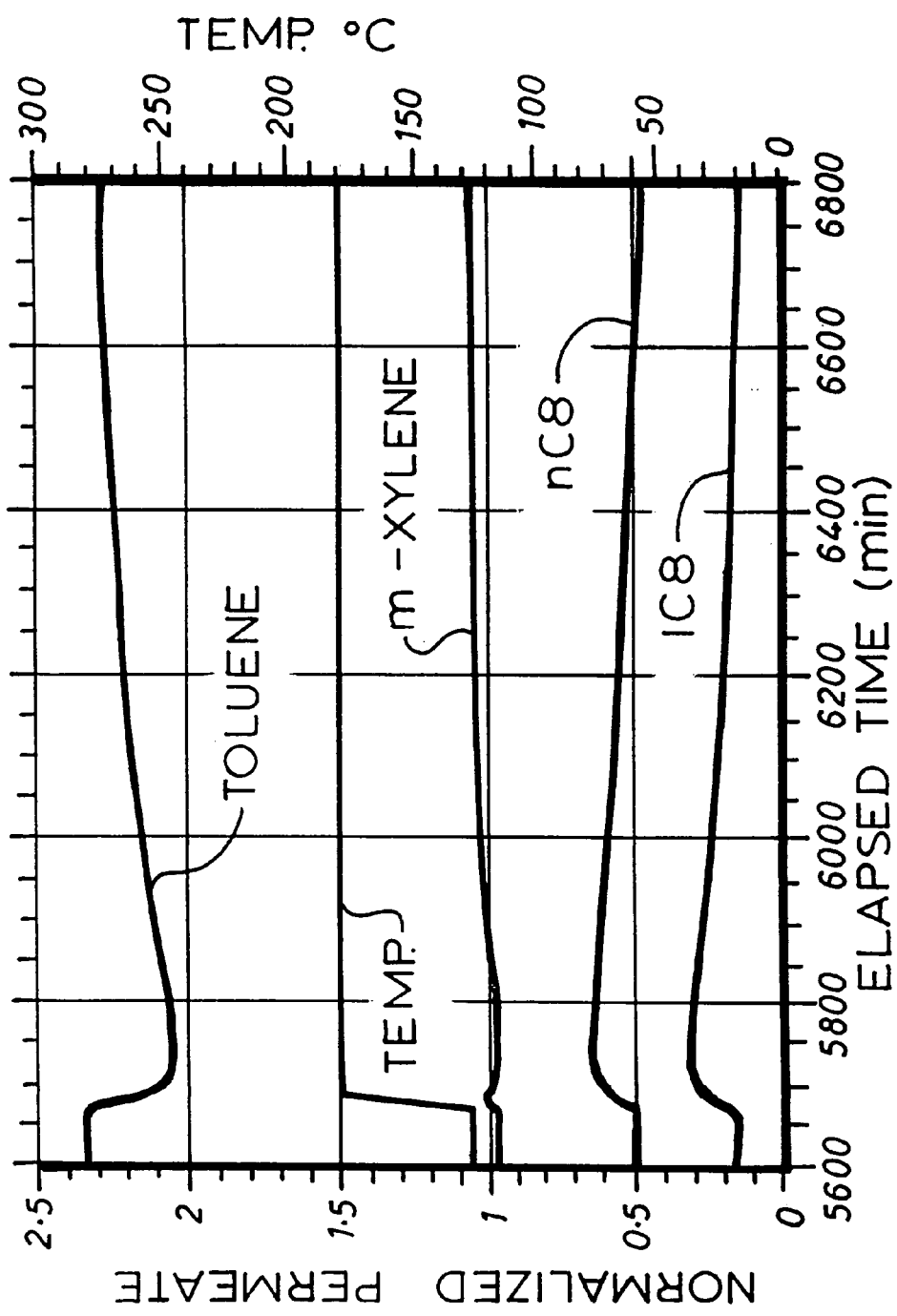
FIG. 5 is a data pilot illustrating the separation properties of a silica/zeolite layer manufactured on a alpha-alumina support by spin-coating in conjunction with the use of a permanent barrier layer as shown in FIGS. 3 and 4. The data plot shows of a relative molar concentrations of the permeate obtained from subjecting the structure to an equimolar mixture of toluene, m-xylene, n-octane, and i-octane.

The layer of Example 2 was used to separate an equimolar mixture of toluene, m-xylene, n-octane and iso-octane. The mixture was applied to the layer side of the layer structure in a continuous flow. A gas sweep (Argon 40–500 ml/min) was applied to the support side of the layer structure, and sampled by a gas chromatograph operating with a 10'×⅛" (about 3 m×3 mm) stainless steel, GP5% SP1200/ 5% Bentone 34 on 100/120 Supelcoport column. The total pressure drop across the layer was 1000 kPa. Analysis of the gc data shows that the layer permeate had an enhanced aromatics content relative to feed content. Representative data at a temperature of 180° C. are shown in FIG. 5. The plot shows the relative concentrations of toluene, m-xylene, n-octane and iso-octane as a function of elapsed time. The largest separation factor is observed for toluene/iso-octane with a value of 10. The total flux of hydrocarbon through the layer corresponds to 100 kg/m$^2$/day at the start and after 16 hours to an average of 40 kg/m$^2$/day.

EXAMPLES 4 TO 26

These examples illustrate manufacture of a layer by dip-coating.

In each of the following Examples, a colloidal MFI zeolite crystal suspension having a mean particle size of 70 nm was employed, together with a gamma-alumina-surfaced alpha-alumina support as described in Example 2. After dipping, the supported layer was dried at 40° C. for 3 hours, at a relative humidity of 60%. Each layer was heated at 10° C./hour to 550° C., maintained at that temperature for 3 hours to effect calcination, and cooled to room temperature at 20° C./hour.

EXAMPLES 4 TO 9

These examples were conducted at a dip time of 5 seconds, a concentration of zeolite of 1.1%, and 1.6 g/l of hydroxypropyl cellulose, varying the pH by adding small amounts of a one molar HNO$_3$ solution, the effect of pH on adhesion being shown.

| Example No. | pH | Adhesion |
|---|---|---|
| 4 | 3.6 | very good |
| 5 | 5.2 | good |
| 6 | 7.6 | acceptable |
| 7 | 9.1 | acceptable |
| 8 | 10.6 | acceptable |
| 9 | 11.7 | poor |

Observation of adhesion standard was subjective; the zeolite layer thickness varied between 1.5 and 2 µm, as determined by S.E.M.

EXAMPLES 10 TO 14

These examples were conducted at a dip time of 5 seconds, a zeolite concentration of 1.1%, a pH of 3.5, and with different binders/surfactants.

| Example No. | Additive | Conc. g/l | Observation Ad; Conty |
|---|---|---|---|
| 10 | PVA, M = 72000 | 20 | very bad; cracks |
| 11 | PVA, M = 3000 | 20 | acceptable; cont. |
| 12 | HPC, M = 100000 | 1.6 | very good; cont. |
| 13 | PVA, M = 3000<br>HPC, M = 100000 | 20}<br>1.6} | good; cont. |
| 14 | None | | |

Ad = adherence
Conty = continuity of layer
Cont = continuous

EXAMPLES 15 TO 20

In these examples, the effects on the properties of the layer resulting from varying the zeolite concentra-tion were studied; the dip time was 5 seconds, pH was 3.5, additive HPC, 1.6 g/liter.

| Example No. | Zeolite Conc. g/l | Layer Thickness µm | Observation |
|---|---|---|---|
| 15 | 0.1 | — | not continuous |
| 16 | 0.5 | — | not continuous |
| 17 | 0.8 | 1.0 | continuous, few cracks |
| 18 | 1.1 | 2.5 | continuous, few cracks |
| 19 | 1.6 | 5.0 | continuous, cracks |
| 20 | 2.1 | 6.5 | continuous, cracks |

EXAMPLES 21 TO 26

In these Examples, the effect of the dipping time was studied; pH was 3.0, additive was HPC at 1.6 g/liter, zeolite content 1.1%.

| Example No. | Dipping Time seconds | Layer Thickness μm | Observation |
|---|---|---|---|
| 21 | 1 | 0.7 to 1.1 | no cracks |
| 22 | 3 | 1.5 to 2 | no cracks |
| 23 | 6 | 2 | no cracks |
| 24 | 10 | 2 to 3 | no cracks |
| 25 | 20 | 3.5 | cracks |
| 26 | 60 | 6.5 to 7 | cracks |

The experiments show that dipcoating can give good continuous layers of low thickness; reparation to remove cracks may be effected by multiple applications.

EXAMPLE 27

This and the following example illustrate manufacture of a layer using hydrothermal crystallization techniques. In this example, the ageing solution contained all the zeolite-forming ingredients.

A synthesis mixture was prepared from the following components, in parts by weight:

| | |
|---|---|
| Colloidal ZSM-5 suspension, 50 nm mean particle size, 6.5% by weight ZSM-5 | 18.79 |
| Tetrapropylammonium bromide (TPABr) | 1.55 |
| Ludox AS-40 colloidal silica | 6.25 |

Using the barrier-forming and spin-coating procedure of Example 1 a water-soaked alpha-alumina disk with 80 nm diameter pores is spincoated with part of the synthesis mixture. The coated disk is transferred to an autoclave and covered with the remainder of the synthesis mixture. The autoclave was transferred to an oven, heated to 160° C. over the course of 2 hours, maintained at that temperature for 120 hours, and cooled to room temperature. The cooled coated disk was washed in flowing tap water for 4 hours, washed twice in demineralized water and then twice more at 80° C. The disk was dried by heating in an oven at 10° C./hour to 110° C., maintained at 110° C. for 5 hours, and allowed to cool at room temperature. Calcining was effected by heating at 10° C./hour to 550° C., maintaining at that temperature for 16 hours, and cooling at 60° C. per hour to room temperature.

From optical and SEM observations—see FIG. 6—the resultant layer is about 1 μm thick and crack-free, with a final grain size of from 100 to 300 nm.

EXAMPLE 28

In this example, the ageing solution contained only those ingredients not already in the layer.

A synthesis mixture was prepared from the following components, in parts by weight:

| | |
|---|---|
| Colloidal silicalite 1 suspension, 20 to 30 nm particle size distribution, 7.2% by weight solids, including template present in the zeolite | 20.00 |
| Ludox AS-40 colloidal silica | 20.00 |
| Demineralized water | 22.50 |

An alpha-alumina disk was dipped into the solution for 5 seconds, and immediately placed in an autoclave and covered with an ageing solution, pH 11.5 with a molar composition of 6.36 $(NH_4)_2O$/1 TPABr/130$H_2O$/0.96 $HNO_3$. The autoclave was put in an oven at 152° C. and maintained there for 7 days. After removal from the autoclave, the disk was repeatedly washed with demineralized water at 70° C. until the conductivity of the last wash—water was 10 microSiemens per centimeter. The disk was then dried at 40° C., relative humidity 60%, for several hours, followed by drying for 1 hour at 105° C.

Figure 8:
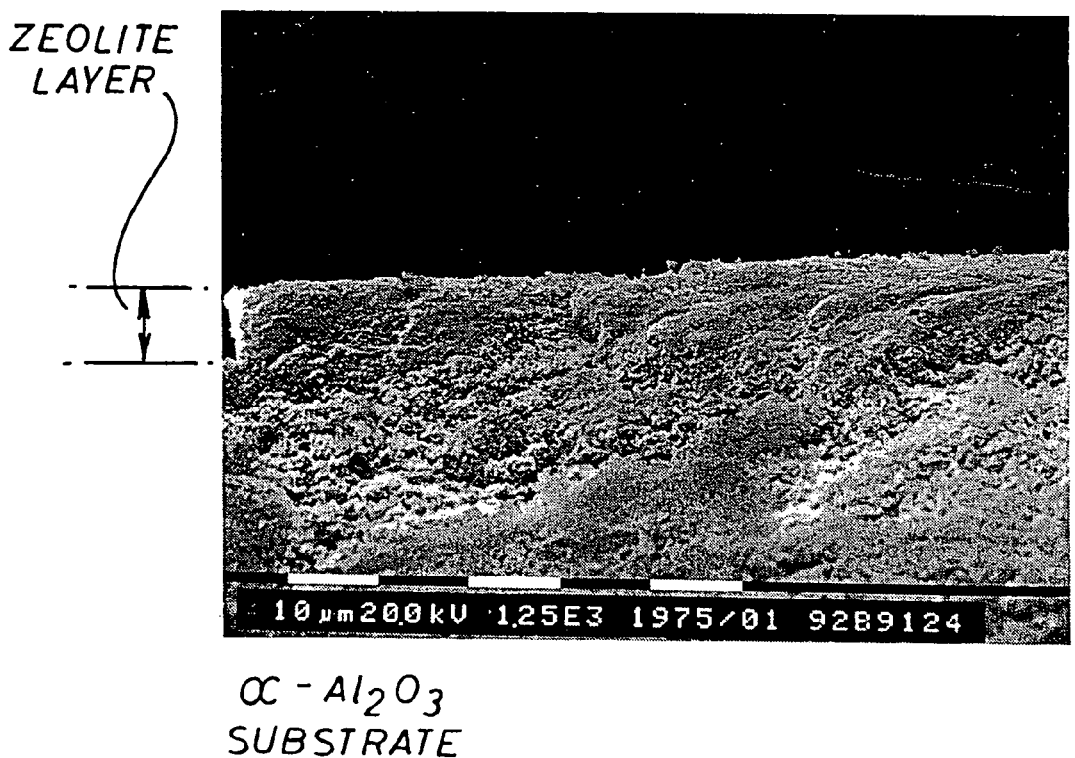
FIG. 8 is a SEM image of the cross-section of a silica/zeolite layer manufactured on alpha-alumina support by dipping the support into a silica/zeolite mixture in conjunction with the use of an aging solution and heat treatment.

Visual inspection showed the disk to be very homogeneous and smooth, with no visual terracing or scaling. By SEM it was seen that the layer had the crystal habit of silicalite—see FIG. 7—with a mean diameter of 100 nm; the cross-section —FIG. 8—indicating a layer thickness of about 10 μm.

EXAMPLE 29

This example illustrates in situ formation of zeolite crystals on a support.

A synthesis solution was prepared from the following components, the parts being given by weight:

| | |
|---|---|
| TPAOH (20% by weight in water) | 41.02 |
| NaOH, pellets | 0.58 |
| $SiO_2$ powder (10% of water) | 8.94 |

The sodium hydroxide was dissolved in the TPAOH solution at room temperature, the silica added, and the mixture heated to boiling with vigorous stirring until a clear solution was obtained. The solution was cooled, weight loss compensated with demineralized water, and the solution filtered through a 0.45 μm filter. The molar composition of the synthesis mixture was:

0.52 $Na_2O$/1.50 $(TPA)_2O$/10 $SiO_2$/142$H_2O$

A quarter of an alpha-alumina disk, pore size 1 μm, diameter 47 mm, was air dried for 2 hours at 150° C., and weighed. 25.05 g of synthesis solution was poured onto the disk in a 150 ml stainless steel autoclave. The autoclave was placed in an oven, heated up to 150° C. in the course of 1 hour and maintained at that temperature for 24 hours.

After cooling the autoclave the support was removed, repeatedly washed with deionized water and air dried at 150° C. for 2 hours. A disk weight increase of 6.9% was noted.

The dried disk was then heated at 2° C./min to a temperature of 475° C. and heated in air at that temperature for 6 hours. Comparison of SEMs of the original alpha-alumina surface —FIG. 9—and of the calcined layer—FIG. 10—shows that the surface of the disk is homogeneously coated with intergrown spherical crystals of about 0.4 μm size, which show the typical crystal habit of silicalite.

EXAMPLE 30

Example 29 was repeated except that crystallization took place at 98° C. for 19 hours. An SEM—FIG. 11—again shows a homogeneous coating of the disk surface, but the crystal size is now smaller, between 0.2 and 0.3 μm.

EXAMPLE 31

Figure 15:
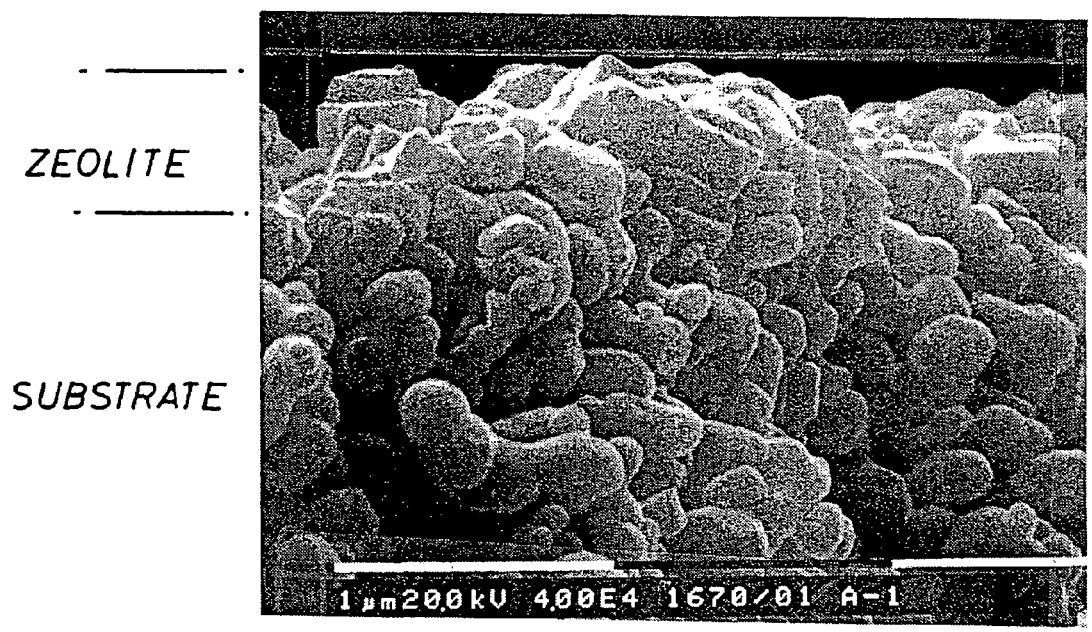
FIG. 15 is an SEM image of a cross-section of a alpha-alumina support surface following in-situ formation of zeolite crystals on the support at 120° C. followed by calcining as shown in FIGS. 12–14.

A synthesis solution was prepared as described in Example 29. The support was an alpha-alumina substrate with a pore size of 160 nm; this was dried at 185° C., placed on the bottom of a 300 ml stainless steel autoclave, covered with 220.4 g of synthesis solution, and the autoclave maintained at 120° C. for 24 hours. After washing, drying and calcining at 475° C. for 12 hours in air, the supported layer was examined by SEM. The photographs—FIGS. 12 to 14 show the surface, FIG. 15 shows a cross-section—indicate a uniform coating of 0.3 µm intergrown silicalite crystals and a layer thickness of about 0.5 µm.

EXAMPLE 32

This example illustrates the manufacture of a zeolite layer by two in-situ crystallization steps at 120° C.

The support comprises a porous alpha-alumina disk, having an average pore diameter of 160 nm, and polished on at least one side. After polishing the support is stored submerged in demineralized water until a day before the preparation of the zeolite layer. Then the support is placed in an oven, heated up at a rate of 1° C./minute to 400° C., kept at 400° C. for 4 hours, and cooled down.

For the first crystallization step, a synthesis mixture is prepared by mixing silica (Baker, >99.75 pure SiO2), Tetrapropyl-ammoniun-hydroxide (TPAOH, Fluka practical grade, 20% in water), NaOH (Merck, 99.99 pure) and demineralized water to get 100 ml of mixture with the following molar composition:

10 SiO2/1.5 (TPA) 20/0.53 Na2O/142H$_2$O. The mixture is boiled on a hotplate for 5 minutes while stirring vigorously. Then the mixture is taken from the hotplate and left to cool down, after which H2O is added to compensate for evaporation losses during boiling. The dry support disk is taken out of the oven and placed on the bottom of a stainless steel autoclave with the polished side facing up. The synthesis mixture is poured in the autoclave next to the disk, which is eventually submerged in the mixture. The autoclave is closed and placed in an oven at 120° C. for 72 hours. After removal from the autoclave the disk is washed 5 to 10 times in demineralized water of 70° C.

For the second crystallization step, a fresh synthesis mixture, identical to the mixture described for the first step, is prepared. The disk is placed in a clean autoclave while still wet, in the same orientation as in the first step, and the fresh synthesis mixture is poured in the autoclave so that the disk is completely submerged. The autoclave is closed and put in an oven at 120° C. for 72 hours. After removal from the autoclave the disk is washed 5 to 10 times in demineralized water of 70° C. After washing the disk is dried in air at 30° C. for 1.5 days. Then the disk is heated up in air at a rate of 10° C./hour to 550° C., kept at that temperature for 16 hours, and cooled down to room temperature at a rate of 20° C./hour X-Ray Diffraction (XRD) analysis shows that MFI-type zeolite crystals have formed on both the top and the bottom surfaces of the disk, the intensity of the XRD-peaks suggesting a zeolite layer thickness of a few microns. Scanning Electron Microscope (SEM) micrographs show that a dense layer, 3 to 5 micrometer in thickness, has formed at the top surface of the disk, and also at the bottom surface of the disk.

EXAMPLES 33, 34, 35 AND 36

These examples illustrate the increase in the amount of zeolite formed on the support with increasing number of crystallization steps. The preparation is identical to that of Example 32, the number of crystallization steps varies from one to four.

XRD patterns have been obtained from these disks after drying but before the thermal treatment at 550° C. Comparison of the XRD-patterns shows that with each step the height of the MFI-zeolite peaks increases while the height of the alpa-alumina peaks decreases, as shown in the following table, where the intensity ratio refers to the ratio between the intensity of the MFI (501)(051)(431) peak and the alpha-alumina (012) peak:

| example | number of steps | ratio |
|---------|-----------------|-------|
| 33      | 1               | 0.37  |
| 34      | 2               | 0.71  |
| 35      | 3               | 1.41  |
| 36      | 4               | 2.78  |

This indicates that the amount of zeolite on the disk increases with each crystallization step.

EXAMPLE 37

This example describes the Helium permeation characteristics of disks prepared using one or two crystallization steps similar to Example 32, the first crystallization step done at 120° C. and the second crystallization step done at 90° C.

Helium permeation through the disk has been measured at total pressures in the range of 1 to 3 bar. Disks prepared using a single crystallization step at 120° C. show He-permeations of several hundreds mmol/sm2bar, increasing with pressure. However, disks prepared using two crystallization steps (120° C. and 90° C.) show He-permeations of a few tens of mmol/sm2 bar that are constant over the pressure range of 1–3 bar.

EXAMPLE 38

A membrane fabricated according to the process of example 32 was mounted into a holder and a 'Wicke-Kallenbach' experiment was carried out. A gas mixture of 49.9% n-butane, 49.9% methane and 0.2% i-butane was passed over one side of the membrane, the other side being continuously purged with a dry helium stream. Both sides of the membrane were kept at atmospheric pressure. The analyses of both gas streams by an on-line gas chromatograph were evaluated and transformed to the corresponding fluxes through the membrane. Selectivities are given by:

S=(C1 (perm)/C1(ret))/(C2(perm)/C2(ret)), where C1 and C2 are concentrations of components 1 and 2, and permeate and retentate streams are indicated by perm and ret, respectively. The calculated fluxes and selectivities are given in the following table:

| T [C.] | Methane flux [mol/m²s] *10⁴ | n-Butane flux [mol/m²s] *10³ | S (n-butane/ methane |
| --- | --- | --- | --- |
| 25 | 1.35 | 2.44 | 18.07 |
| 50 | 2.15 | 2.67 | 12.42 |
| 75 | 2.78 | 2.81 | 10.11 |
| 100 | 4.94 | 3.14 | 6.36 |
| 125 | 8.75 | 3.36 | 3.84 |
| 150 | 13.1 | 3.40 | 2.60 |
| 175 | 17.1 | 3.24 | 1.89 |
| 200 | 21.3 | 3.07 | 1.44 |

(Reference: E. Wicke and R. Kallenbach, Surface diffusion of carbon dioxide in activated charcoals, Kolloid Z., 97 (1941), 135)

EXAMPLE 39

A membrane fabricated according to the process of example 32 was used for a test similar to that in example 38. A gas mixture of 48.3% methane and 51.7% i-butane was used as feed stream. The calculated fluxes and selectivities are given in the following table:

| T [C.] | Methane flux [mol/m²s] *10⁴ | i-Butane flux [mol/m²s] *10⁵ | S (methane/ i-butane |
| --- | --- | --- | --- |
| 25 | 1.29 | 7.18 | 1.92 |
| 50 | 2.38 | 7.29 | 3.49 |
| 75 | 3.76 | 7.41 | 5.43 |
| 100 | 4.90 | 9.38 | 5.59 |
| 125 | 6.29 | 13.2 | 5.10 |
| 150 | 8.42 | 17.7 | 5.09 |
| 175 | 12.2 | 22.3 | 5.86 |
| 200 | 17.8 | 25.7 | 7.41 |

EXAMPLE 40

A membrane fabricated according to the process described in example 32 was used for a test similar to that in example 38. A gas mixture of 50.0% n-butane and 50.0% i-butane was used as feed stream. The calculated fluxes and selectivities are given in the following table:

| T [C.] | n-Butane flux [mol/m²s] *10³ | i-Butane flux [mol/m²s] *10⁴ | S (n-butane/ i-butane) |
| --- | --- | --- | --- |
| 25 | 1.33 | 0.26 | 51.95 |
| 50 | 1.66 | 0.71 | 23.55 |
| 75 | 1.99 | 0.82 | 24.21 |
| 100 | 2.29 | 1.21 | 18.93 |
| 125 | 2.24 | 1.60 | 14.00 |
| 150 | 2.45 | 1.85 | 13.24 |
| 175 | 2.28 | 1.89 | 12.06 |
| 200 | 2.26 | 2.06 | 10.97 |

EXAMPLE 41

A membrane fabricated according the description in example 32 was used for a test similar to that in example 38.) A gas mixture containing 0.31% p-xylene, 0.26% o-xylene and methane as balance was used as feed stream. The calculated fluxes and selectivities are given in the following table:

| T [C.] | p-Xylene flux [mol/m²s] *10⁶ | o-Xylene flux [mol/m²s] *10⁷ | S (p-xyelen/ o-xylene |
| --- | --- | --- | --- |
| 100 | 3.54 | 0.49 | 60.10 |
| 150 | 3.43 | 0.66 | 43.46 |
| 175 | 3.33 | 0.92 | 30.49 |
| 200 | 3.02 | 1.22 | 20.76 |

EXAMPLE 42

A membrane fabricated according the description in example 32 was used for a test similar to that in example 38. A gas mixture containing 5.5% benzene, 5.5% cyclohexane and methane as balance was used as feed stream. The calculated fluxes and selectivities are given in the following table:

| T [C.] | Benzene flux [mol/m²s] *10⁷ | Cyclohexane flux [mol/m²s] *10⁷ | S (benzene/ cyclohexane |
| --- | --- | --- | --- |
| 25 | 2.64 | 0.53 | 5.01 |
| 50 | 3.03 | 0.66 | 4.60 |
| 75 | 4.61 | 0.92 | 4.99 |
| 100 | 5.67 | 1.98 | 2.86 |
| 125 | 9.23 | 3.20 | 2.88 |
| 150 | 9.49 | 4.48 | 2.12 |
| 175 | 10.9 | 3.30 | 3.30 |
| 200 | 17.8 | 4.48 | 3.97 |

EXAMPLE 43

A membrane fabricated according the description in example 32 was used for a test similar to that in example 38. A gas mixture containing 7.6% n-hexane, 15.4% 2,2 dimethylbutane and methane as balance was used as feed stream. The calculated fluxes and selectivities are given in the following table:

| T [C.] | n-Hexane flux [mol/m²s] *10⁴ | 2,2-Dimethylbutane flux [mol/m²s] *10⁷ | S (benzene/ cyclohexane |
| --- | --- | --- | --- |
| 20 | 1.2 | 1.9 | 600 |
| 50 | 1.5 | 2.3 | 340 |
| 100 | 3.1 | 2.7 | 1150 |
| 150 | 3.0 | 1.9 | 1560 |
| 200 | 2.4 | 1.2 | 2090 |

EXAMPLE 44

This example illustrates the growth of zeolite layers by multiple crystallizations, without refreshing the synthesis mixture as in example 32, but by increasing the crystallization temperature stepwise.

A porous alpha-alumina disk with a pore diameter of 160 nm and polished on one side was cut into four equal-sized parts. The parts were weighed and placed, polished side up, on teflon rings resting on the bottom of a stainless steel autoclave. In the autoclave was poured 70.22 g of a synthesis solution with a molar composition of 10 SiO2/1.56 (TPA)20/0.275 Na2O/147H2O.

The open autoclave was placed in an exsiccator, which was then evacuated during 0.5 hours to increase the penetration of synthesis solution into the disks. Then the autoclave was taken out of the exsiccator, closed, and placed in an oven at room temperature. The oven was heated up to 90° C. in a few minutes and kept at that temperature for 48 hours. The autoclave was then cooled to room temperature, opened and one of the support pieces was removed. The autoclave was closed again and placed in an oven at room temperature. The oven was heated up to 110° C. in a few minutes and kept at that temperature for 24 hours. The autoclave was cooled down again and the second piece was removed. The temperature cycle was repeated two more times, first for 24 hours at 130° C. and then for 24 hours at 150° C. The four pieces of the disk were all washed with demineralized water of 70° C. until the washing water had a conductivity of about 6 micro Siemens/cm, dried at 105° C. and cooled to room temperature in an exsiccator. It was observed that with each aging step the weight of the disk pieces increased, as shown in the following table:

| disk piece # | temperature history ° C. | weight increase % |
|---|---|---|
| 1 | 90 | 0.88 |
| 2 | 90 + 110 | 2.04 |
| 3 | 90 + 110 + 130 | 3.50 |
| 4 | 90 + 110 + 130 + 150 | 5.63 |

XRD analysis showed that with each ageing step the intensity of the zeolite peaks increased with respect to the intensity of the alpha-alumina peaks, as shown in the following table:

| disk piece # | peak intensity ratio: peak at d = 0.385 nm (MFI)/ peak at d = 0.348 nm (Al2O3) |
|---|---|
| 1 | 0.190 |
| 2 | 0.217 |
| 3 | 0.236 |
| 4 | 0.332 |

These results indicate that with each ageing step at a higher temperature new zeolite crystals are deposited on the support.

What is claimed is:

1. A supported inorganic layer comprising contiguous particles of a crystalline molecular sieve, the particles having a means particle size within the range of from 20 nm to 1 μm, wherein the support is selected from the group consisting of glass, fused quartz, silica, silicon, clay, metal, porous glass, sintered porous metal, titania, and cordierite, and wherein the particle size distribution is such that at least 95% of the particles have a size within ±33% of the mean.

2. A supported inorganic layer comprising contiguous particles of a crystalline molecular sieve, the particles having a mean particle size within the range of from 20 nm to 1 μm, wherein the support is selected from the group consisting of glass, fused quartz, silica, silicon, clay, metal, porous glass, sintered porous metal, titania, and cordierite, and wherein the layer primarily contains nanopores having size of between 1 and 10 nm.

3. A supported inorganic layer comprising contiguous particles of a crystalline molecular sieve, the particles having a mean particle size within the range of from 20 nm to 1 μm, wherein the support is selected from the group consisting of glass, fused quartz, silica, silicon, clay, metal, porous glass, sintered porous metal, titania, and cordierite, and wherein the layer primarily contains micropores having a size of between 0.2 and 1 nm.

4. A supported inorganic layer comprising contiguous particles of a crystalline molecular sieve, the particles having a mean particle size within the range of from 20 nm to 1 μm, wherein the support is selected from the group consisting of glass, fused quartz, silica, silicon, clay, metal, porous glass, sintered porous metal, titania, and cordierite, and wherein the layer comprises molecular sieve crystals in a particulate matrix, the pore structure being defined by the interstices between the particles, between the crystals, and between the particles and the crystals, the pore structure advantageously being between 0.2 and 1 nm in size.

5. A supported inorganic layer comprising contiguous particles of a crystalline molecular sieve, the particles hang a mean particle size within the range of from 20 nm to 1 μm, wherein the layer primarily contains nanopores 1 and 10 nm.

6. A supported inorganic layer comprising contiguous particles of a crystalline molecular sieve, the particles having a mean particle size within the range of from 20 nm to 1 μm, wherein the layer primarily contains micropores having a size of between 0.2 and 1 nm.

7. A layer as claimed in claim 6, wherein the layer comprises molecular sieve crystals in a particular matrix, the pore structure being defined by the interstices between the particles, between the crystals, and between the particles and the crystals.

* * * * *